United States Patent [19]

Selignan et al.

[11] Patent Number: 4,597,490
[45] Date of Patent: Jul. 1, 1986

[54] DEVICE FOR LIFTING, TRANSFERRING AND DEPOSITING OBJECTS

[75] Inventors: Olivier Selignan; Olivier Bourgain; Jean-Marie Martin, all of Paris, France

[73] Assignee: Chaussures Andre, Paris, France

[21] Appl. No.: 699,616

[22] Filed: Feb. 8, 1985

[30] Foreign Application Priority Data

Jun. 15, 1984 [FR] France ............................... 84 09395

[51] Int. Cl.4 ............................................. B65G 47/92
[52] U.S. Cl. .................................. 198/468.5; 198/433; 198/803.6; 271/901
[58] Field of Search .................. 198/433, 468.5, 465.4, 198/803.1, 803.6; 271/901

[56] References Cited

U.S. PATENT DOCUMENTS 3,621,971  11/1971  Daniels, Sr. et al. ............... 198/433
4,372,538  2/1983  Balfanz ............................. 198/468.5

Primary Examiner—Joseph E. Valenza
Assistant Examiner—Michael Stone
Attorney, Agent, or Firm—James C. Wray

[57] ABSTRACT

A lifting surface, a deposit surface and a transfer assembly is equipped with electromagnets and counter-magnets, which when they are activated permit the grasping of one or more thicknesses of a material supplied upon the surface. The assembly transfers the grasped pieces to the surface and the counter-magnets are recuperated at the same time as the electromagnets, to their initial position.

5 Claims, 5 Drawing Figures

DEVICE FOR LIFTING, TRANSFERRING AND DEPOSITING OBJECTS

BACKGROUND TO THE INVENTION

The invention relates to a device for lifting, transferring and depositing objects.

OBJECT OF THE INVENTION

An object of the invention is to provide a device adapted to discharge objects or pieces which may be situated in a single layer or a stack of a plurality of thicknesses. The latter hypothesis excludes a large number of conventional take-up systems.

SUMMARY OF THE INVENTION

The object of the invention is achieved by a device comprising:

(a) a lifting surface having openings smaller than the objects, which is capable of receiving the objects to be lifted;

(b) a deposit surface having openings smaller than the objects, which is capable of receiving objects to be deposited;

(c) a transfer assembly movable between a first and a second position, said transfer assembly including an upper element constituted by a group of electromagnets of substantially vertical line of action, arranged so that when the transfer assembly is in its first position the electromagnets are substantially above the lifting surface, their lines of action being capable of intercepting objects received on the said lifting surface, and above the openings of this surface, and that when the transfer assembly is in the second position the electromagnets are substantially above openings of the deposit surface, a lower element constituted by a group of counter-magnets associated with the electromagnets, arranged so that when the transfer assembly is in the first position the counter-mangets are situated beneath the lifting surface on the line of action of the electromagnets and at a distance permitting this action, the counter-magnets being smaller than the openings of the lifting surface and those of the deposit surface;

(d) means for displacement of the transfer assembly between its first and its second position;

(e) means for controlling the electromagnets; and (f) means for return of the counter-magnets, capable of collecting them beaneath the openings of the deposit surface and replacing them in the position which they occupy when the transfer assembly is in the first position.

By means of this device there is no hindrance to taking up objects or pieces constituted by a plurality of thicknesses. One important application of such a device concerns discharge robots at the extremity of an automatic cutting chain (laser, water jet, etc.) for materials in sheet form, especially hides.

According to one form of embodiment the counter-magnets an be constituted by metallic balls; in that case the recuperation means comprise a fixed reception means designed in the form of an inclined plane; in one particular realisation these are channels.

According to another form of embodiment the counter-magnets are constituted by metallic plates (offering a better surface for co-operation with the electromagnets), the lower profile of which is shaped in order to be capable of being received and centred easily in a lodgement by a reception means fast with the transfer assembly.

The control of the electromagnets is advantageously selective, which permits of taking the objects to be lifted in a selected order and re-disposing them in another order or the same order, thus facilitating subsequent sorting operations.

The one and/or the other of the lifting and deposit surfaces is or are constituted by parallel moving belts spaced by intervals forming the said openings.

BRIEF DESCRIPTION OF DRAWINGS

Further advantages and characteristics of the invention will appear on reading of the non-limitative description which will follow, given with reference to the accompanying drawings, wherein.

DESCRIPTION OF PREFERRED EMBODIMENTS

Figure 1:
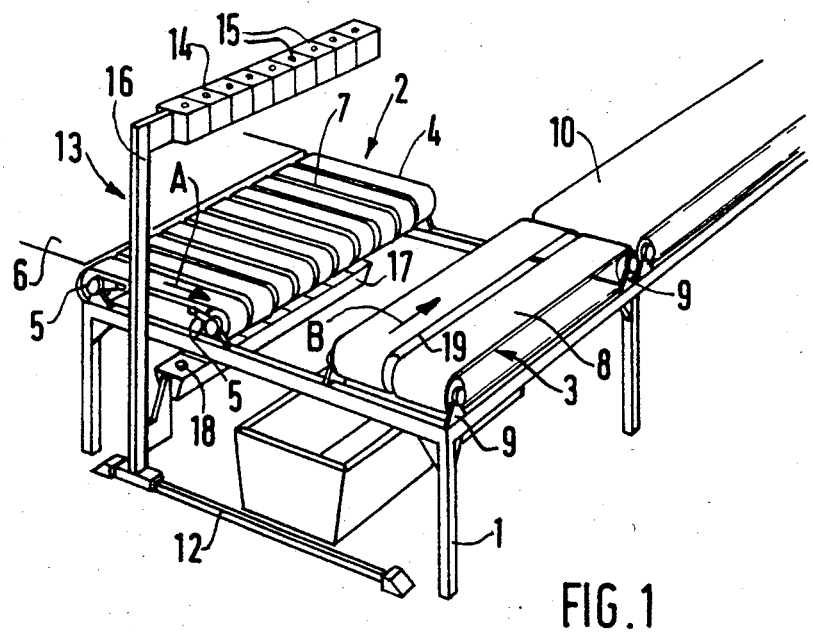
FIGS. 1 to 4 represent in perspective a first form of embodiment of the device according to the invention, in four different stages of its operation

FIG. 1 shows a chassis 1 supporting the lifting surface 2 and the deposit surface 3.

The lifting surface 2 is constituted by the upper runs of ten endless belts 4, placed parallel with a first direction of advance indicated by the arrow A. The endless belts 4 are mounted on and driven by rollers 5. Counter-rollers or deflector plates (not shown in the drawings) permit of lifting the lower run of each belt 4 to just beneath the upper run, in order to come quite close to the surface 2 from beneath.

The belts 4 receive the objects to be lifted from a feed surface 6, which can be fixed and associated with an object drive device, or can be movable.

The belts 4 form an interval 7 between them, the utility of which will be seen hereinafter.

The deposit surface 3 is constituted by the upper runs of two endless belts 8, placed parallel to a second direction of advance (arrow B) here perpendicular to the first direction.

The belts 8 are mounted on and driven by rollers 9.

The deposit surface 3 permits of transferring the objects to a discharge surface 10 itself made in the form of a fixed table or a movable table (here an endless belt).

On the chassis 1 or independently thereof a fixed rail 12 permits of guiding the movable transfer assembly 13 in horizontal translational movement.

The transfer assembly 13 comprises an upper element 14 designed in the form of a line of electromagnets 15 with substantially vertical line of action. This line 14 can slide vertically in a vertical guide support 16 in which there can likewise slide a lower element 17 constituted by a line of counter-magnets 18 corresponding in number and in vertical alignment with the electromagnets 15. When the assembly 13 is in the position according to FIG. 1, that is to said overall in the region of the lifting surface 2, the line of action of the electromagnets passes through the intervals 7 between belts 4.

By means which are not represented the rail 12 permits of brining the transfer assembly 13 into a second position situated overall in the region of the lifting surface 3. The line 14 of electromagnets is then aligned vertically with the interval 19 left between the belts 8.

The operation of the device is as follows:

At the commencement of the cycle the transfer assembly 13 is situated for example in its first position as represented in FIG. 1.

Figure 2:
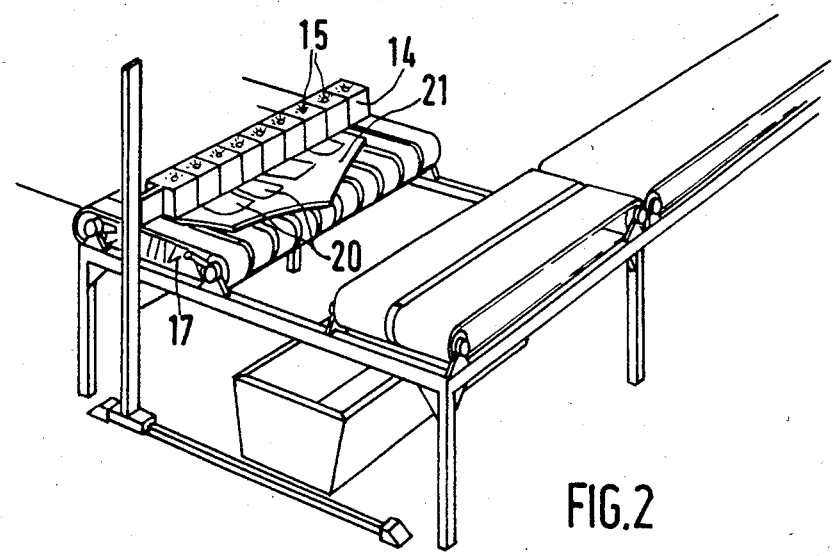

The objects to be transferred are brought on to the lifting surface 2. In this case (FIG. 2) these are pieces 20 cut from a sheet or a set of sheets of material 21.

The line 14 of electromagnets is lowered to approach the pieces 20 and the line 17 of counter-mangets is raised to approach the line of electromagnets.

The electromagnets are energised by a control device (not shown) and in accordance with a control logic pre-established as a function of position, form and order of the pieces 20 to be taken up.

When an electromagnet 15 is energised it attracts the counter-magnet 18 situated beneath it. The latter comes to be applied against the electromagnet, passing through the opening 7, with interposition of the piece 20.

Figure 3:
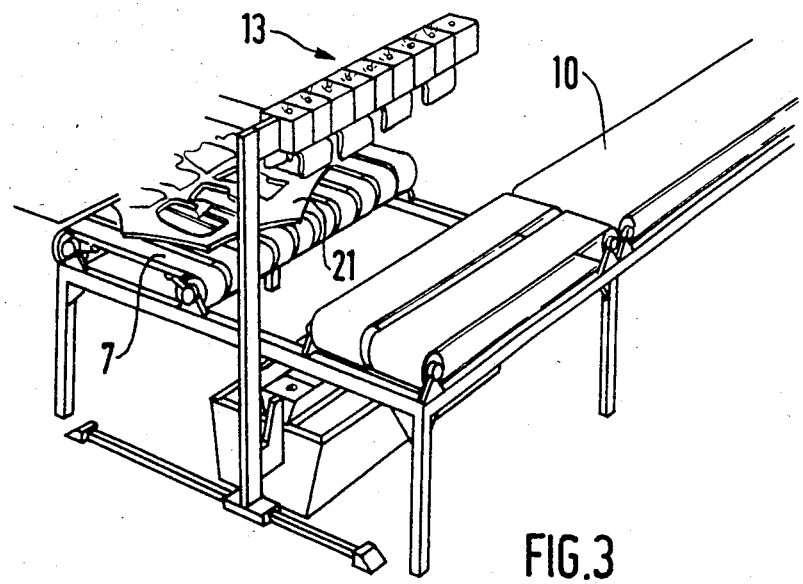

When all the pieces 20 to be lifted have been grasped (simultaneously or each in turn), the transfer assembly 13 is displaced (FIG. 3) to its second position, the line 14 and the line 17 having if necessary been respectively raised and lowered.

Figure 4:
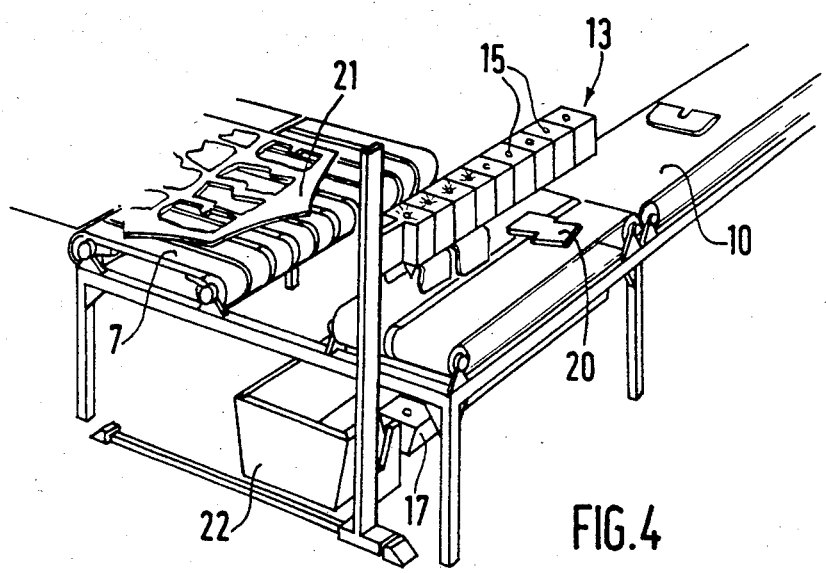
Figure 5:
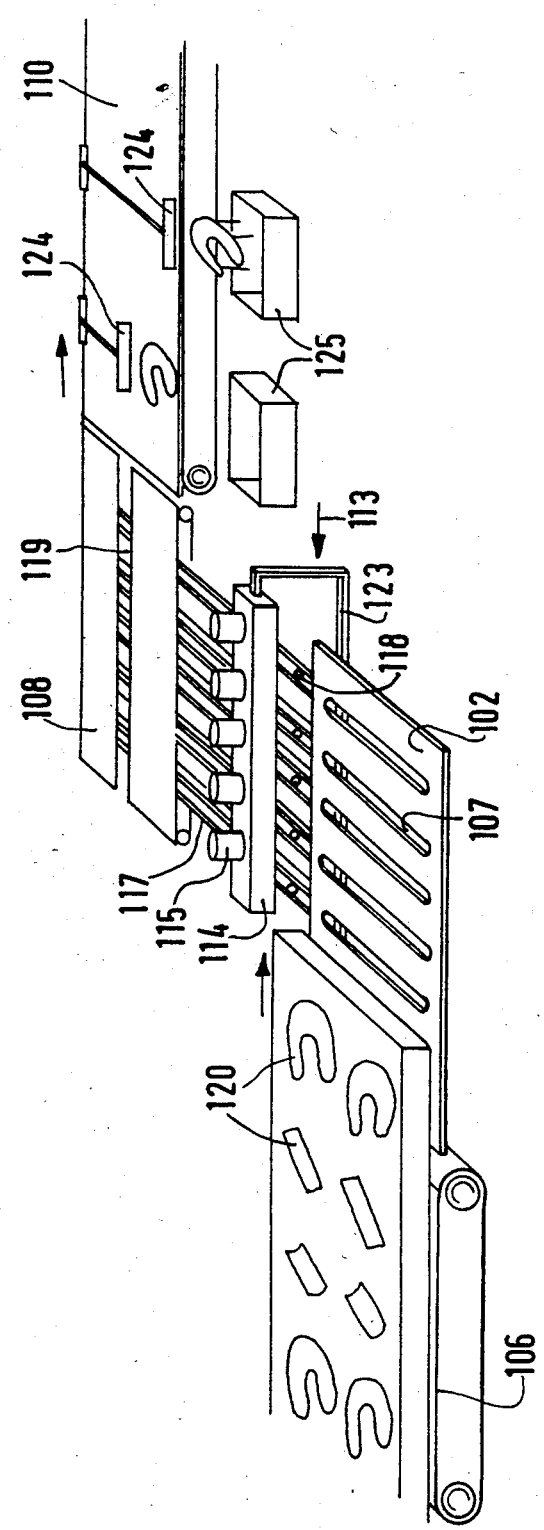
FIG. 5 represents in perspective a second form of embodiment of the device according to the invention.

In this second position (FIG. 4) each electromagnet is de-energised so that the counter-magnet 18 corresponding to it drops, passes through the opening (19) and is collected in an adequate lodgement of the line 17. As regards the piece 20 thus liberated, it falls on to the upper runs of the belts 8 and is transported towards the discharge surface 10. In order better to monitor the discharge of the pieces 20 it is advantageous to effect a de-energisation of the electromagnets in progressive order, permitting of leaving a certain distance between each discharge piece, favouring subsequent treatment.

When all the electromagnets have been de-energised and all the counter-magnets have been collected in their lodgement, the transfer assembly is returned to the first position.

The sheet 21, once all the pieces 20 have been withdrawn, can be collected in a vessel 22 placed at the exit of the belts 4.

The movements of the belts 4 and 8, those of the transfer assembly 13 and the control device of the electromagnets are synchronized to ensure good progress of the operation of the device.

In this form of embodiment the counter-magnets are advantageously made in the form of small circular plates offering a good surface for co-operation with the electromagnets. At their lower parts they are shaped as downwardly convergent cone frusta or cones and are received in a lodgement of matching form; these forms permit automatic positioning of the counter-magents on their reception on the line 17 serving as means for recuperation of the counter-magnets 18.

In a second form of embodiment of the invention the lifting surface is constituted by a fixed table 102 comprising elongated parallel openings 107. The pieces 120 to be lifted are brought on to the table 102 by a moving belt 106.

The transfer assembly 113 comprises a line 114 of electromagnets 115 and counter-magnets 118 made in the form of balls. These balls can circulate in channels which are slightly inclined from a high position beneath the deposit surface to a low position beneath the lifting surface 102. The balls are prevented from descending below alignment with the line 114 of electromagnets by lugs (not visible in the Figure) carried by a bar 123 fast with the line 114, these lugs entering the channels 117.

The lifting surface comprises two moving belts 108 separated by an interval 119 and followed by a discharge surface 110 comprising selective sorting-discharge devices 124 which orient the pieces towards collecting vessels 125.

The operation of this device is substantially analogous with that of the previous device. It is essentially the manner of recuperation of the counter-magnets 118 which differs. When the counter-magnets 115 are de-engergised above the deposit surface 108, the balls 118 drop through the openings and are collected in the channels 117 in which the lugs of the bar 123 block their descent.

When the transfer assembly 113 returns to the first position, the balls 118 re-descend along the channels.

In both described forms of embodiment it is possible according to circumstances to grasp one piece with one or more electromagnets.

We claim:

1. A device for the lifting, transference and depositing of objects comprising:
   (a) a lifting surface having openings smaller than the objects, which are capable of receiving the objects to be lifted;
   (b) a deposit surface having openings smaller than the objects, which are capable of receiving objects to be deposited;
   (c) a transfer assembly movable between a first and a second position, said transfer assembly including an upper element constituted by a group of electromagnets with substantially vertical line of action, arranged so that when the transfer assembly is in the first position the electromagnets are substantially above the lifting surface, their lines of action being capable of intercepting objects received on the said lifting surface and above the openings of this surface, and that when the transfer assembly is in the second position the electromagnets are substantially above openings of the deposit surface, a lower element constituted by a group of counter-magnets associated with the electromagents, arranged in such manner that when the transfer is in the first position the counter-magnets are situated beneath the lifting surface on the line of action of the electromagnets and at a distance permitting this action, the counter-magnets being smaller tha the openings of the lifting surface and those of the deposit surface;
   (d) means for displacement of the transfer assembly between its first and its second position;
   (e) means for control of the electromagnets; and
   (f) means for recuperation of the counter-magnets, capable of collecting them beneath the openings of the deposit surface and replacing them in the position which they occupy when the transfer assembly is in the first position.

2. A device according to claim 1, wherein the recupteration means comprise a reception means fast with the transfer assembly.

3. A device according to claim 1, wherein the recuperation means comprise a fixed reception means made in the form of an inclined plane.

4. A device according to claim 1, 2 or 3, including means for selective control of the electro-magnets.

5. A device according to claim 1, 2 or 3, wherein at least one of the lifting surface and deposit surface is constituted by parallel moving belts spaced by intervals forming the said openings.

* * * * *